United States Patent [19]

Lee

[11] Patent Number: 5,790,721
[45] Date of Patent: Aug. 4, 1998

[54] LOW-NOISE FIBER-OPTIC AMPLIFIER UTILIZING POLARIZATION ADJUSTMENT

[75] Inventor: Seung-hee Lee, Kangnam-gu, Rep. of Korea

[73] Assignee: Samsung Electronics Co., Ltd., Kyungki-Do, Rep. of Korea

[21] Appl. No.: 472,973

[22] Filed: Jun. 7, 1995

[30] Foreign Application Priority Data

Feb. 21, 1995 [KR] Rep. of Korea ............ 1995-3349

[51] Int. Cl.$^6$ .................................................. H01S 3/00
[52] U.S. Cl. ............................. 385/11; 385/27; 385/24; 359/341; 359/349
[58] Field of Search ......................... 385/24, 27, 11; 359/341, 349, 249, 179; 350/389

[56] References Cited

U.S. PATENT DOCUMENTS

| | | | |
|---|---|---|---|
| 4,923,291 | 5/1990 | Edagawa et al. | 350/389 |
| 5,272,560 | 12/1993 | Baney et al. | 359/249 |
| 5,297,436 | 3/1994 | Chan et al. | 385/13 |
| 5,367,527 | 11/1994 | Gruneisen | 372/6 |
| 5,400,164 | 3/1995 | Kurtzke et al. | 359/156 |
| 5,430,795 | 7/1995 | Taga et al. | 359/179 |

Primary Examiner—Rodney B. Bovernick
Assistant Examiner—Yisun Song
Attorney, Agent, or Firm—Cushman Darby&Cushman IP Group of Pillsbury Madison & Sutro LLP

[57] ABSTRACT

A fiber-optic amplifier with reduced noise characteristics is provided. A polarization beam splitter/recombiner splits an input signal beam into two orthogonally polarized optical signals and recombines the separately treated signals. A phase controller compensates for optical path differences that result from dividing the input signal beam into two different paths. A wavelength division multiplexing coupler couples a pump laser beam with the input signal beam. A polarization maintained doped optical fiber amplifies the split optical signals while maintaining their original states of polarization. A linear polarizer rejects from each amplified split optical signal the noise with polarization orthogonal to the amplified signal. By suppressing such noise power, a portion of amplified spontaneous emission with polarization orthogonal to the signal is suppressed, thereby reducing the total output noise power.

10 Claims, 1 Drawing Sheet

LOW-NOISE FIBER-OPTIC AMPLIFIER UTILIZING POLARIZATION ADJUSTMENT

BACKGROUND OF THE INVENTION

The present invention relates to a low-noise fiber-optic amplifier utilizing polarization adjustment, and more particularly, to a fiber-optic amplifier which removes an unnecessary part of the output from the amplifier, i.e., which removes a noise with polarization orthogonal to a signal, utilizing the polarization characteristic.

FIG. 1 is a schematic block diagram illustrating a conventional fiber-optic amplifier including a pumping laser diode (LD) 5 for generating a laser beam, a wavelength multiplexing coupler (WDM) 3 for combining the laser beam and an input beam, i.e., input signal beam and optical fiber 8 for amplifying the combined laser and input beam, the signal experiences gain within the gain media, while another photon group, due to spontaneous emission and thus Amplified Spontaneous Emission (ASE), forms the noise of the amplifier. This group of spontaneously emitted photons limit the amplification mechanism efficiency. In a conventional fiber-optic amplifier as shown in FIG. 1, the separation of a signal and noise is difficult due to the random polarization and due to the absence of polarization maintenance in the optical fiber and optical element.

SUMMARY OF THE INVENTION

To solve the above problems, it is an object of the present invention to provide a fiber-optic amplifier which can remove a noise having polarization perpendicular to that of the signal beam.

Accordingly, to achieve the above object, a fiber-optic amplifier is provided comprising: a polarization beam splitter/recombiner for splitting an input signal beam into two orthogonally polarized optical signals and recombining the separately treated signals; a phase controller for compensating for possible optical path differences that results from using two different paths; a wavelength division multiplexing coupler for coupling a pump laser beam and the input signal beam; a polarization maintained doped optical fiber for amplifying the optical signals while maintaining the original state of polarization; and a linear polarizer for rejecting noise with polarization orthogonal to the signal.

This invention can reduce the total output noise power by suppressing the noise power of a portion of amplified spontaneous emission, with polarization orthogonal to the input signal beam.

BRIEF DESCRIPTION OF THE INVENTION

Figure 1:
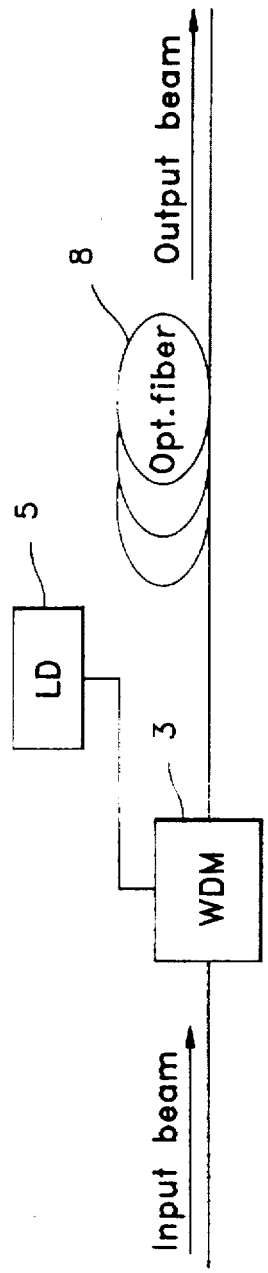
FIG. 1 is a schematic block diagram illustrating a conventional fiber-optic amplifier.
Figure 2:
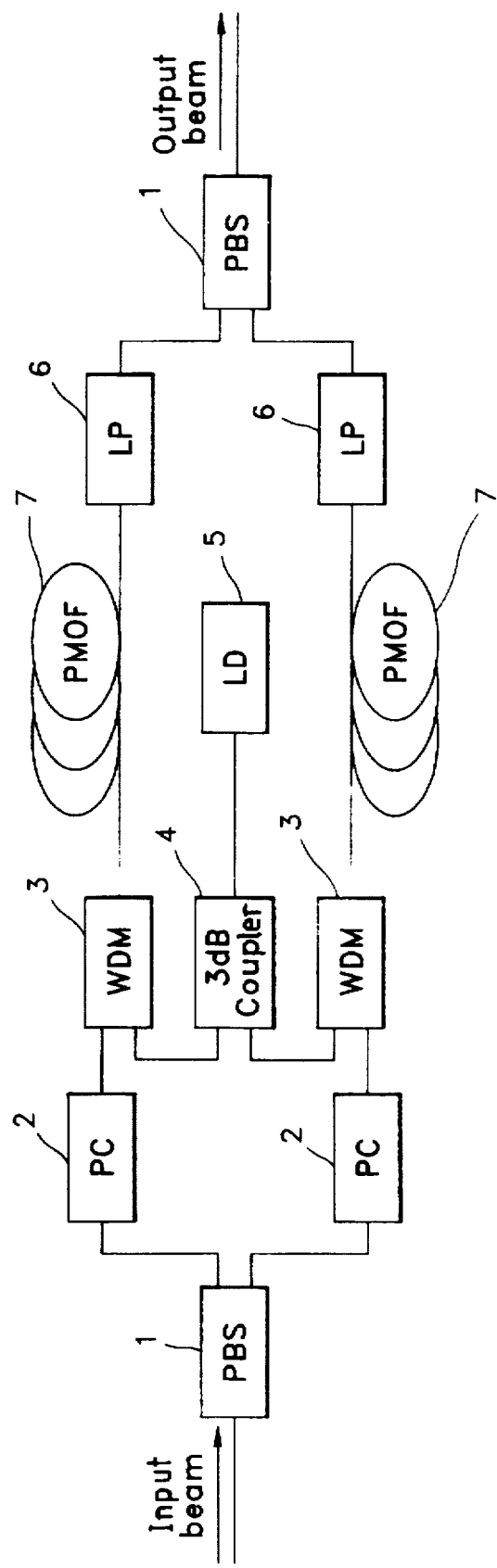
FIG. 2 is a schematic block diagram illustrating a fiber-optic amplifier according to the present invention.

FIG. 2 is a schematic block diagram showing a fiber-optic amplifier according to the present invention. In FIG. 2, reference numeral 1 is a polarization beam splitter/recombiner (PBS) for splitting an input signal beam into two orthogonally polarized beams. Reference numeral 2 is a phase controller (PC) for compensating for optical phase changes that may be introduced by splitting the signal into two signals having two different optical paths. Reference numeral 5 is a pumping laser diode (LD) for providing the pump power necessary for the excitation of the gain media. Reference numeral 4 is a 3 dB coupler for dividing the pump laser beam into two equal parts. Reference numeral 3 is a wavelength division multiplexing (WDM) coupler for coupling the pump laser beam and the input signal beams. Reference numeral 7 is a polarization maintaining doped optical fiber (PMOF) for amplifying the input signal beam while maintaining the original state of polarization. Reference numeral 6 is a linear polarizer for transmitting only the beam with polarization that is parallel to the linear polarizer's transmission axis.

An optical signal input to an amplifier input port is divided into two orthogonally polarized beams and experiences gain through two different gain media 7. This may give rise to polarization mode dispersion which could be compensated for by the use of phase controller 2.

A pump laser beam provided by the laser diode 5 is equally divided by 3 dB coupler 4 and enters the gain media to provide energy necessary for the excitation of the gain media. Since each of the two already split beams have a well-defined state of polarization, adequate alignment of the transmission axis of the PBS 1, PMOF 7, and linear polarizer (LP) 6 is necessary for each of the two different paths according to the polarization orientation provided by PBS 1. PBS 1 is provided at the output port of the illustrated embodiment, and is also aligned such that its transmission axis is also parallel to the linear polarizers located ahead of it.

The major contributor of the noise generated in a fiber-optic amplifier is a spontaneous emission process which results in amplified spontaneous emission (ASE). Since ASE is unpolarized, the present invention suppresses the ASE with polarization that is orthogonally polarized with respect to the input signal beam.

To verify the effect of the present invention, a fiber-optic amplifier having the structure of the aforesaid embodiment was subject to analytical experiment, and consequently, it showed a maximum noise reduction of 50 percent, especially in cases where small input signal power is used.

As described above, the present invention, by suppressing the noise power of a portion of amplified spontaneous emission with polarization orthogonal to an input signal beam, can reduce the total output noise power.

What is claimed is:

1. A fiber-optic amplifier comprising:
   a polarization beam splitter/recombiner for splitting an input signal beam into two orthogonally polarized split optical signals and recombining the split optical signals;
   a phase controller for compensating for optical path differences that result from splitting the input signal beam into two different paths;
   a wavelength division multiplexing coupler for coupling a pump laser beam to the input signal beam;
   two polarization maintained doped optical fibers for amplifying the respective split optical signals while maintaining an original state of polarization of said respective split optical signals; and
   a linear polarizer for rejecting from each of said respective split optical signals noise with polarization orthogonal to the corresponding split optical signal.

2. The fiber-optic amplifier described in claim 1, wherein said linear polarizer comprises an optical signal transmission axis aligned with a transmission axis induced at said polarization beam splitter/recombiner.

3. An optical signal amplifier, comprising:

means for splitting an input signal beam into a plurality of split signal beams having different polarization components and different paths;

means for controlling a phase of each split signal beam and thereby compensating for optical path differences that result from splitting the input signal beam into different paths;

means for coupling a pump laser beam to each said split signal beam;

a plurality of polarization maintained optical transmission mediums for amplifying respective ones of said split signal beams while maintaining an original state of polarization of said split signal beams;

means for rejecting from an output of each said optical transmission medium noise signal having a polarization orthogonal to a polarization component of a transmitted split signal beam that originated from said input signal beam; and means for combining said plurality of split signal beams to form a combined amplified output signal beam.

4. The optical signal amplifier according to claim 3, wherein said means for rejecting comprises a plurality of linear polarizers, one for each said split signal beam, each linear polarizer comprising an optical signal transmission axis aligned with a transmission axis of a corresponding split signal beam.

5. The optical signal amplifier according to claim 3, wherein each said optical transmission medium comprises a polarization maintained doped optical fiber.

6. An optical signal amplifier, comprising:

a polarization splitter for splitting an input signal beam into a plurality of split signal beams having different polarization components with set states of polarizations and different paths;

an optical amplifier comprising a plurality of optical transmission mediums each having an output and amplifying respective ones of said split signal beams without changing said set states of polarization of said polarization components of said respective ones of said split signal beams;

a polarization component rejector having plural outputs and rejecting, from an output of each said optical transmission mediums, polarization components with states of polarizations substantially different than said set states of polarizations; a phase controller for compensating for optical path differences that result from splitting the input signal beam into different paths and a polarization combiner for combining signal beams at said plural outputs of said polarization component rejector to form a combined amplified output signal beam.

7. The optical signal amplifier according to claim 6, wherein each of said plurality of optical transmission mediums comprises a polarization maintained doped optical fiber.

8. The optical signal amplifier according to claim 6, wherein said plurality of split signal beams comprise a total of two split signal beams including first and second split signal beams.

9. The optical signal amplifier according to claim 8, wherein said polarization component rejector comprises a linear polarizer.

10. The optical signal amplifier according to claim 6, wherein said optical amplifier further comprises a pump laser beam and a wavelength division multiplexing coupler, and wherein each said plurality of optical transmission medium comprises a polarization maintained doped optical fiber.

* * * * *